Sept. 1, 1970 F. E. POST 3,526,832
FREQUENCY RESPONSE ANALYZER HAVING A FUNCTION GENERATOR FOR PROVIDING STIMULATING SIGNALS TO A SYSTEM UNDER TEST
Filed March 15, 1968 6 Sheets-Sheet 1

INVENTOR
FRANK E. POST
BY
Maleson, Kimmelman & Ratner
ATTORNEYS.

INVENTOR
FRANK E. POST
BY
Maleson, Kimmelman & Ratner
ATTORNEYS.

INVENTOR
FRANK E. POST
BY
Maleson, Kimmelman & Ratner
ATTORNEYS.

INVENTOR
FRANK E. POST
BY
Maleson, Kimmelman & Ratner
ATTORNEYS.

INVENTOR
FRANK E. POST
BY
Maleson, Kimmelman & Ratner
ATTORNEYS.

INVENTOR
FRANK E. POST
BY
Maleson, Kimmelman & Ratner
ATTORNEYS.

United States Patent Office 3,526,832

Patented Sept. 1, 1970

3,526,832

FREQUENCY RESPONSE ANALYZER HAVING A FUNCTION GENERATOR FOR PROVIDING STIMULATING SIGNALS TO A SYSTEM UNDER TEST

Frank E. Post, Warminster, Pa., assignor to Weston Instruments, Inc., Newark, N.J., a corporation of Delaware Filed Mar. 15, 1968, Ser. No. 713,461
Int. Cl. G01r *27/00;* G06g *7/19;* G06f *15/34*
U.S. Cl. 324—57 14 Claims

ABSTRACT OF THE DISCLOSURE

A frequency response analyzer for providing constant amplitude stimulating signals to a system under test. Cycle signals are generated indicating completion of each cycle of the stimulating signal. A correlator section of the analyzer compares the output of the system under test with the stimulating signal by first simultaneously applying that output to a pair of multipliers one of which is programmed for sine and the other for cosine multiplication. The output of each of the multipliers is integrated and the resultant signal stored as a DC voltage. Integration is initiated upon application of a predetermined cycle signal. After a predetermined time interval integration is terminated only upon occurrence of a cycle signal.

BACKGROUND OF THE INVENTION

Field of the invention

This invention relates to the field of art of frequency response analysis in which a signal is generated to stimulate a system under test and the response of that system to the stimulating signal is measured over a range of frequencies.

Prior art

Frequency response analyzers comprise a function generator section which generates a stimulating signal having a constant amplitude over a predetermined frequency range. The stimulating signal is used as a reference and as the frequency of the stimulating signal is varied an output of the system under test is measured by a correlator section of the analyzer. The correlator compares the output of the test system with the stimulating signal and provides measurements such as transfer function measurements.

A stimulating signal of sinusoidal waveform has been produced by generating a plurality of separate signals of rectangular waveform and separate signals of triangular waveform. These signals are summed to provide a composite stimulaitng signal waveform of sinusoidal shape. Accordingly, the stimulation of the system under test may be started at zero degrees and the zero crossings of the waveform may be controlled. The amplitude of the stimulating signal may be maintained constant with high precision for both time and frequency changes since the function generator is not dependent on frequency sensitive elements but rather on the stability of precision resistors.

The output of the system under test is simultaneously applied to two multipliers of the correlator section one of which is programmed for sine and the other cosine multiplication. The timing sequence of the multiplication is controlled by the function generator and the output of each multiplier is applied to a separate integrator. Each integrator integrates its respective input and stores the output as a DC voltage. The stored DC voltages are proportional to the cartesian coordinates of a vector which represents the fundamental frequency component of the output of the system under test. Noise and harmonic frequencies originally present in the system under test output have been integrated to a point where their effect is negligible. The cartesian coordinates which are stored as DC voltages may be resolved to provide vector length or amplitude R and phase relationship $\theta$. In this manner, as the frequency of the stimulating signal is varied the values R and $\theta$ provide a measurement of the gain of the system under test with respect to frequency.

In operation, a stimulating signal of predetermined frequency is applied to the system under test and the cycles of that applied signal are counted to provide an integration period over a predetermined integer number of cycles. At the end of the count the stored DC voltages of the integrators are read out as signals proportional to the cartesian coordinates. It is important that integration occur over an integer number of cycles in accordance with the theory of operation or else substantial errors are introduced. The error increases as the frequency of the stimulating signal decreases. In order to achieve the foregoing, a cycle timing system has been used to determine the frequency setting of the function generator. The timing system first controls the correlator to initiate integration. The timing system then counts a predetermined integer number of cycles of the stimulating signal based on the frequency setting of the function generator. At the termination of the count a signal is applied to control the correlator to terminate integration. If there is a difference between the frequency setting of the function generator and the actual frequency of the stimulating signal it will be understood that the integration period will be more or less than an integer number of cycles, thereby providing measurement error.

SUMMARY OF THE INVENTION

The frequency response analyzer of the invention provides cycle signals each indicating completion of a cycle of a waveform of the stimulating signal. A precision timer is associated with the correlator section of the analyzer and produces a time interval signal after a predetermined time interval and continues timing until being turned off. To provide a measurement by the correlator each of the integrators is controlled so that upon application of a predetermined cycle signal (1) integration is initiated and (2) timing is initiated by the timer. Upon application of a first cycle signal after occurrence of a time interval signal (1) integration is terminated and (2) timing is stopped. The timer is effective to vary the amplitude of the output of each of the integrators to compensate for any additional integration time beyond the time interval. In this manner integration is provided over a predetermined integer number of cycles and the actual time of integration is measured. If the actual integration time exceeds the predetermined time interval compensation is provided.

BRIEF DESCRIPTION OF THE DRAWINGS

Referring now to FIG. 1 there is shown a frequency response analyzer comprising a function generator section 10 and a correlator section 11 of the type described in detail in (1) U.S. patent application Ser. No. 581,275 for Transfer Function Analyzer filed Sept. 22, 1966, now U.S. Pat. 3,453,534 and having the same applicant and assigned to the same assignee as the present invention, (2)

Figure 1:
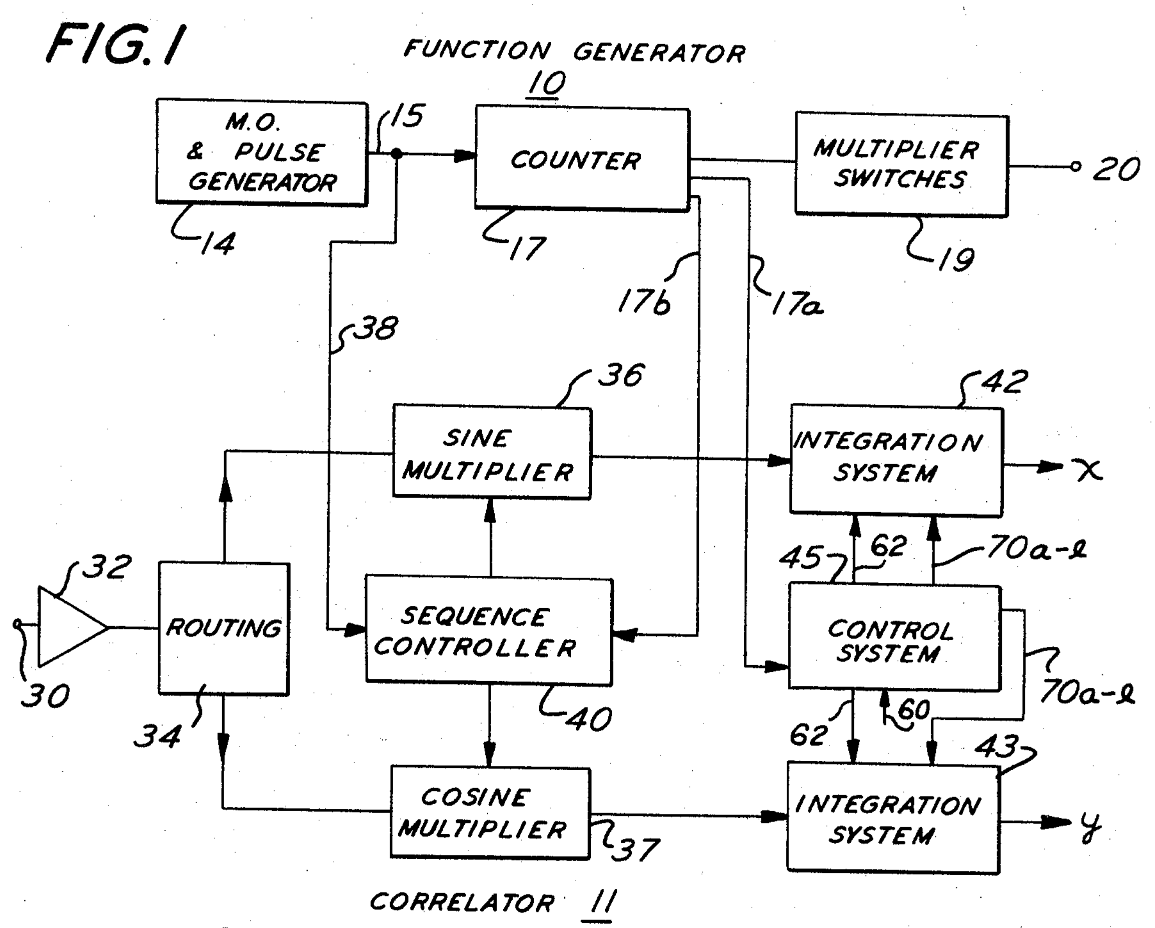
FIG. 1 illustrates in block diagram form a frequency response analyzer embodying the invention.

U.S. patent application Ser. No. 568,058 for Transfer Function Generator filed July 26, 1966 by Reginald Catherall, et al., now U.S. Pat. 3,340,469 and (3) Instruction Manual, Transfer Function Analyzer model series DA 400 Weston Instruments, Inc., Hatboro, Pa., 19040. As set forth in the foregoing, function generator 10 includes a master oscillator and pulse generator 14 which produces a train of pulses which are applied by way of output 15 to a counter system 17. A master oscillator and pulse generator 14 is described in detail in copending U.S. patent application Ser. No. 713,513 filed Mar. 15, 1968 for Frequency Response Analyzer by Donald Kotas and assigned to the same assignee as the present invention. The counter provides differing counting pulses to multiplier switching circuits 19 which generate a composite waveform approximating a sine wave at output 20. The composite waveform is applied as a stimulating signal to a system under test such as a servo-system.

Figure 1A:
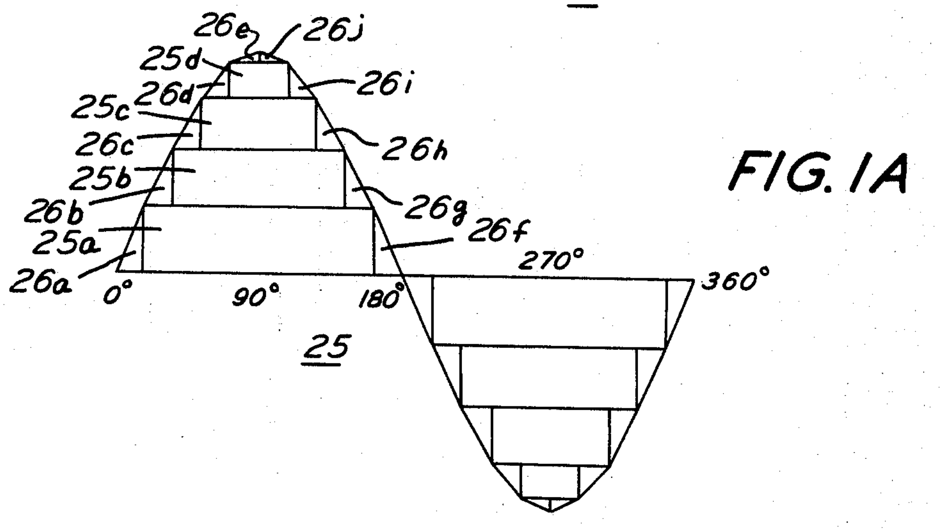
FIG. 1A illustrates a waveform generated by the function generator of FIG. 1.

One cycle 25 of a composite sine waveform of a simple type is illustrated in FIG. 1A. The first half cycle of waveform 25 may comprise four parts 25*a–d* of rectangular waveform. The rectangular waveforms are of progressively shorter duration and of progressively smaller amplitudes with the four parts being symmetrical and added one on the other in the illustrated order. Further the first quarter cycle has added thereto five parts 26*a–e* of right-angle triangular waveform of equal durations but progressively smaller amplitudes. The second quarter cycle also has five triangular parts 26*f–j* identical in amplitude with parts 26*a–e* respectively but with the slopes of the hypotenuses reversed at 90° of waveform 25.

Each of the triangular waveforms 26*a–j* are representative of 18° steps. In order to provide a smoother waveform the hypotenuse of each of the triangular waveforms may be divided into one degree steps. It will also be understood that the first half cycle of waveform 25 may be divided into more parts such as eight parts of rectangular waveform and a corresponding number of nine parts of triangular waveform. The second half cycle of waveform 25 is identical with the first half cycle except that it is negative going instead of positive going.

To generate the composite waveform 25, counter system 17 includes counters which count up from 0° to 90° and then count down from 90° to 0° for the first half cycle. During the up count the slope of the hypotenuse of the triangular waveform is in one direction and during the count down the slope is in the other direction. At 180° an individual counter of counter system 17 is set to provide for a polarity reversal and then another up count is performed from 180° to 270° and then a down count from 270° to 360°. At 360° a cycle has been completed and the zero axis is again crossed in an upward direction and the previously described counting is repeated for another cycle. The composite waveform may be generally defined as a uniform cyclic waveform or a single frequency alternating waveform.

In order to indicate the completion of a cycle comprising a positive half cycle and a negative half cycle counter output 17*a* provides a pulse signal. In this manner a pulse at output 17*a* may be defined as indicating a zero crossing in a positive going direction. However, it will be understood that a cycle may be indicated at other identical points on the waveforms such as at 180° points, at 90° points, at zero crossings of negative going direction, etc.

Multiplier switches 19 comprise a plurality of semiconductor switches connected to respective precision resistors which generate the previously described rectangular shaped and triangular shaped waveforms. The switch-resistor combinations are weighted to provide the proper size rectangles and triangles. In this manner there is produced a substantially sine wave of both positive and negative half cycles having its timing accurately controlled.

As previously described the composite waveform is applied by way of output terminal 20 as a stimulating signal to a system under test. In a testing procedure an output of the system under test is applied as an input signal to an input terminal 30 of correlator section 11 which may provide a measurement of the transfer function of the test system. That signal is applied by way of a correlator input amplifier 32 to a multiplier routing network 34. When the operator is ready to make a measurement, he actuates a measure switch which operates routing network 34 to apply the signal from the system under test simultaneously to two digital multipliers 36 and 37; multiplier 36 being programmed for sine multiplication and multiplier 37 being programmed for cosine multiplication. Each of these multipliers uses banks of precision resistors (not shown) similar to that of multiplier switches 19 and are controlled in synchronism with the stimulating signal.

Specifically the output pulses from generator 14 are applied by way of output 15 and a conductor 38 to a sequence controller 40. In addition the differing counting pulses from counter 17 are applied by way of output 17*b* to controller 40. Sequence controller 40 is similar in construction to that of counter 17 and counts in accordance with the applied pulses and counting pulses. Accordingly controller 40 applies control signals to sine and cosine multipliers 36 and 37 so that these multipliers operate in synchronism with the generation of the stimulating composite waveform.

The output of sine multiplier 36 is applied to a variable gain integration system 42 which integrates the output of multiplier 36 over an integration period or interval and stores the resultant integrated signal as a DC voltage. Similarly the output of cosine multiplier 37 is applied to a variable gain integration system 43, identical to system 42, and integrates the output of multiplier 37 over a predetermined integration period and stores the resultant signal as a DC voltage. It is the resultant DC voltages produced at the end of the integration period which are used in the measurement of the $x$ and $y$ coordinates.

In order to effectively ignore the distortion and noise which may be associated with the system under test, correlator 11 uses multiplication and integration techniques involving the following theory of operation. A Fourier analysis of the signal from the system under test may be expressed as $$f(t)=A+x_1 \sin wt+x_2 \sin 2wt+ \\ +y_1 \cos wt+y_2 \cos 2wt+ \quad (1)$$

where

A=DC component of $f(t)$

If the stimulating signal is selected to be equal to $x_1 \sin wt$ and $y_1 \cos wt$ then the coordinates $x$ and $y$ may be solved as follows:

$$x=\frac{1}{n}\int_0^{n \text{ cycles}} f(t) \sin wtdt \quad (2)$$

$$y=\frac{1}{n}\int_0^{n \text{ cycles}} f(t) \cos wtdt \quad (3)$$

where $n$ is an integer

An output representative of Equation 2 is provided by multiplier 36 and integration system 42 which provides a stored DC voltage. This DC voltage is proportional to the $x$ coordinate of a vector which represents the fundamental frequency component $w$ of the output from the system under test. Similarly a signal representative of Equation 3 is provided by multiplier 37 and integration system 43 which provides a stored DC voltage proportional to the $y$ coordinate of a vector which represents the fundamental frequency component $w$ of the system under test output. It will now be understood that the foregoing solution is based on an integration over $n$ complete cycles of the output from the system under test. If the period of integration is more or less than $n$ cycles the stored DC voltages will not be accurately representative of the $x$ and $y$ coordinates.

In addition to providing integration periods over $n$ cycles it is also important that the integration periods be of an effective equal time duration for each of the differing stimulating signal frequencies. If the periods of integration were different and no compensation were provided then there would be no basis of comparison between a correlator output for a stimulating frequency of for example 1,000 Hz. and a stimulating frequency of 1 Hz. However, in order to provide integration over $n$ cycles it is many times not possible to maintain the actual integration period of equal time duration. For example, the stimulating frequencies may include integer number as well as non-integer number of cycles per second and each of the frequencies may have actual values more or less than their desired values. In order to compensate for any errors due to varying integration periods, integrations systems 42 and 43 each include a variable buffer amplifier which is varied in gain by a control system 45 in accordance with the actual period of time of integration.

Figure 2:
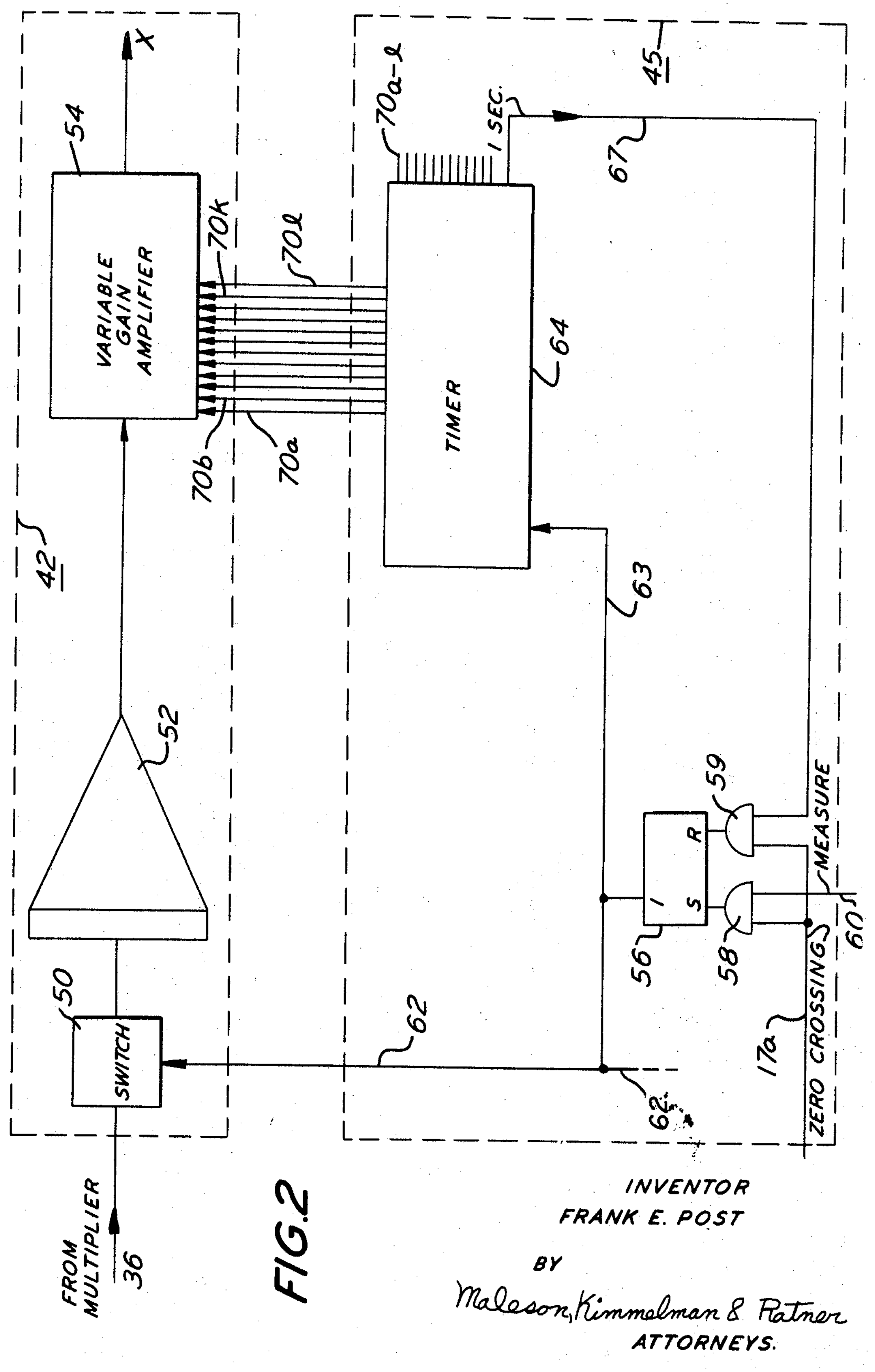
FIG. 2 illustrates in block diagram form portions of the analyzer of FIG. 1.

Referring now to FIG. 2 there is shown in more detail the variable gain integration system 42 and control system 45. It will be understood that integration system 43 may be identical with integration system 42 and control system 45 is effective to simultaneously control systems 42 and 43.

The output of multiplier 36 is applied by way of an analog switch 50 to an input of an analog integrator 52 of conventional type. The DC output voltage of integrator 52 is applied by way of a variable gain buffer amplifier 54 to provide the $x$ coordinate of the vector. The opening and closing of switch 50 is controlled by a flip-flop circuit 56 having its set and reset terminals connected to the outputs of AND gates 58 and 59 respectively. Zero crossing conductor 17*a* is connected to one input of each of AND gates 58 and 59 and provides a 1-state signal for each positive going zero crossing. The other input conductor 60 to AND gate 58 has a 1-state signal applied only when the operator actuates a measure switch for measurement at a predetermined stimulating signal frequency.

With 1-state signals in time coincidence at both inputs of gate 58, a stimulating signal cycle is at 0° and flip-flop 56 is set. Thus a 1-state signal is applied from the 1-side of flip-flop 56 by way of conductor 62 to turn on switch 50 thereby to begin the period of integration. Simultaneously the 1-state output from the 1-side of flip-flop 56 is applied by way of conductor 63 to an input of a precision timer 64. Upon application of the 1-state signal, timer 64 begins timing from zero time. At the termination of a predetermined time interval as for example one second, timer 64 produces a 1-state time interval signal by way of output conductor 67 which is applied as an enabling input to AND gate 59. At one second time, if a positive going zero crossing is occurring, enabled gate 69 produces a 1-state output which is effective to reset flip-flop 56 thereby to simultaneously (1) turn off switch 50 and to terminate integration and (2) stop the timing. However if conductor 17*a* is not at a 1-state at exactly one second, the integration and the timing continue until the positive going zero crossing does occur. In this manner the period of integration extends beyond one second until the occurrence of the next zero crossing of the stimulating signal so that an integer number of cycles are integrated. Timer 64 stores the total time of the actual period of integration.

Timer 64 provides control signals on conductors 70*a–l* which are effective to vary the gain of amplifier 54 in accordance with the value of the time of integration beyond the predetermined time interval of one second. If the integration periods of all signals of different frequencies were of the same time duration as for example one second, then it would not be necessary to vary the gain of the output of the integrators. Without varying the gain the amplitude measurements at the different frequencies could be compared one with the other. However, with varying integration periods the value of the gain must be varied inversely with respect to the value of said additional time beyond one second in order that the measurements have the same basis of comparison.

Accordingly timer 64 is effective to maintain the gain of amplifier 54 at a maximum if the actual integration period is exactly one second and to adjust the gain inversely with respect to any additional time beyond one second. As will later be described in detail, timer 64 is effective to step resistances in the feedback loop of the amplifier to vary the gain of the amplifier in accordance with the increase in time over one second. Stated differently the gain of the amplifier is inversely proportional with the value of the additional time of integration beyond one second.

Figure 3:
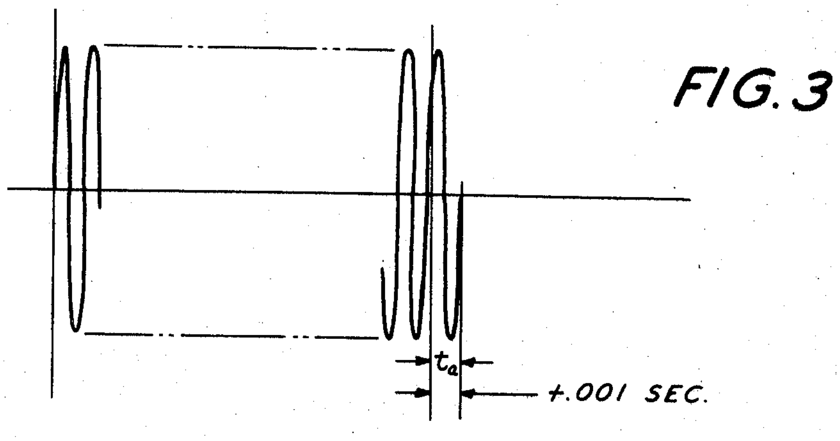
FIGS. 3–3D illustrate stimulating signals of differing frequencies helpful in explaining the invention.
Figure 3A:
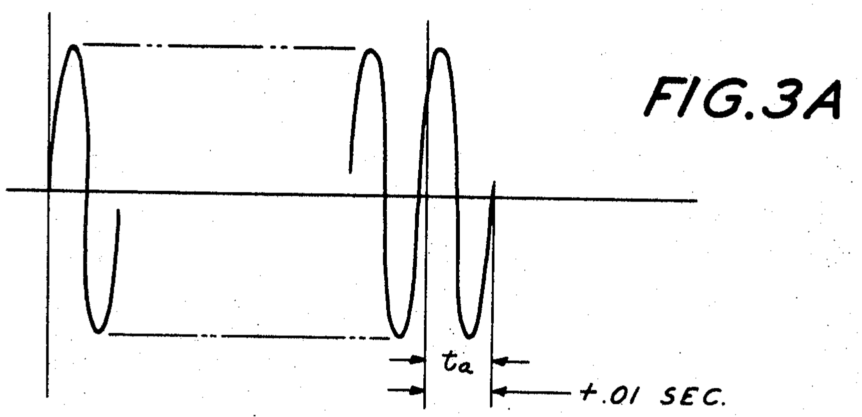
Figure 3B:
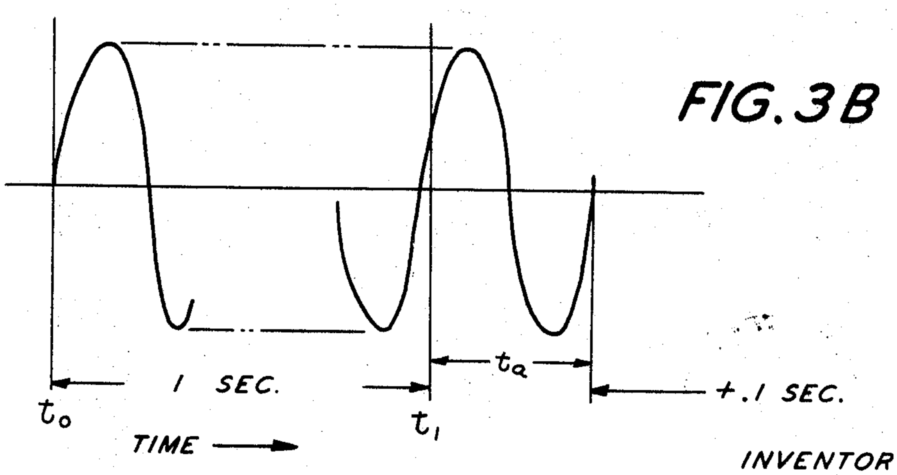
Figure 3C:
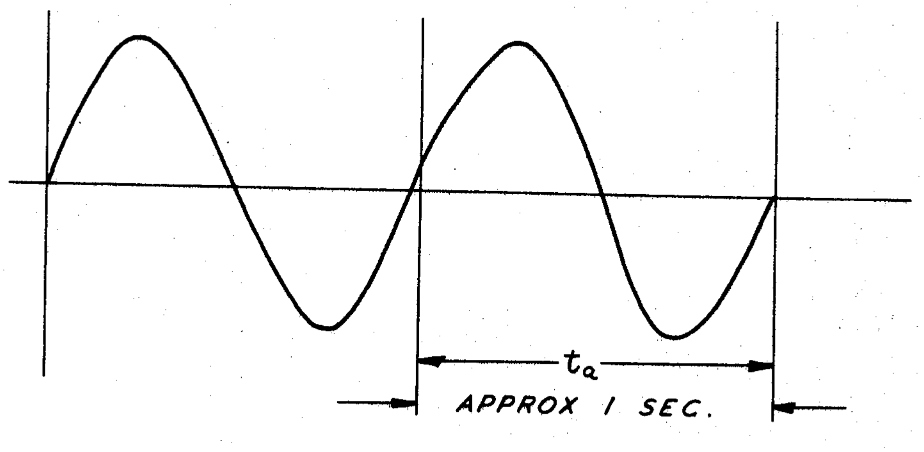
Figure 3D:
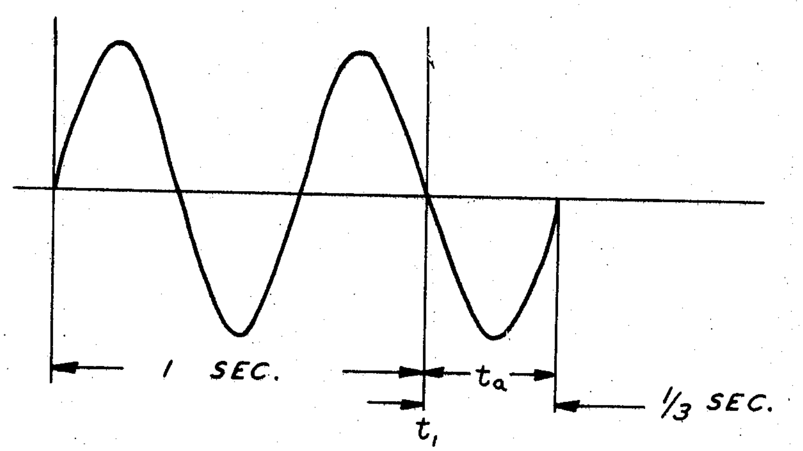

The foregoing will be better understood with respect to differing stimulating signal frequencies and FIGS. 3–3C relate to frequencies of an integer number of cycles per second while FIG. 3D relates to an noninteger number of cycles per second. In FIG. 3 function generator 10 has been set to generate a frequency of 1,000 Hz. However, the frequency that is actually generated may be somewhat more than a desired 1,000 Hz. frequency. Specifically, at the end of one second the stimulating signal extends slightly beyond the positive going zero crossing and therefore the integration period does not terminate until approximately 1.001 second. Accordingly in order to compensate for the integration time beyond one second, viz, $t_a$=.001 second, the gain is required to be reduced approximately .1%. FIG. 3A illustrates a 100 Hz. stimulating signal which extends slightly beyond the zero crossing at one second for a total integration period of 1.01 second. Accordingly to compensate for the integration time beyond one second the gain is required to be reduced 1%. In FIG. 3B the 10 Hz. stimulating signal is illustrated as having a total integration period of 1.1 second and the gain would be reduced approximately 10%. In FIG. 3C for a 1 Hz. stimulating signal and as in the previous examples of FIGS. 3–3B with the zero crossing occurring slightly before one second, the integration period extends for approximately two seconds and the gain is required to be reduced approximately 50%.

It will be understood that FIGS. 3–3C each illustrate substantially maximum additional time beyond one second at an actual frequency which is slightly higher than the desired frequency. In each case the additional time or overage $t_a$ may be less than the illustrated duration as long as the period of integration terminates at the next positive going zero crossing. Stated differently, the additional time $t_a$ must be less than one cycle. The same criteria apply if the actual frequency is slightly lower than the desired frequency.

While FIGS. 3–3C illustrate stimulating frequencies having an integer number of cycles per second it will be understood that the operation is similar for frequencies having a noninteger number of cycles per second. As for example, in FIG. 3D there is illustrated a stimulating frequency of 1.5 Hz. In the manner previously described the integration period is initiated at a positive going zero crossing. Timer 64 produces an enabling signal at one second and the control system looks for the next positive going zero crossing for integration over an integer number of cycles. Accordingly, integration is terminated and timer 64 is stopped at 1⅓ second ($t_a$=⅓ second) and the gain is required to be reduced approximately 25%. In this manner the signal of FIG. 3D is integrated over an integer number of cycles and the measurement produced by correlator 11 may be directly compared with the measurements at all other frequencies whether integer or noninteger cycles per second. While the waveform of FIG. 3D is illustrated as being exactly 1.5 Hz. it will be understood that variations in frequency may occur in the manner described with respect to FIGS. 3–3C with compensation provided in the manner described above.

Figure 4A:
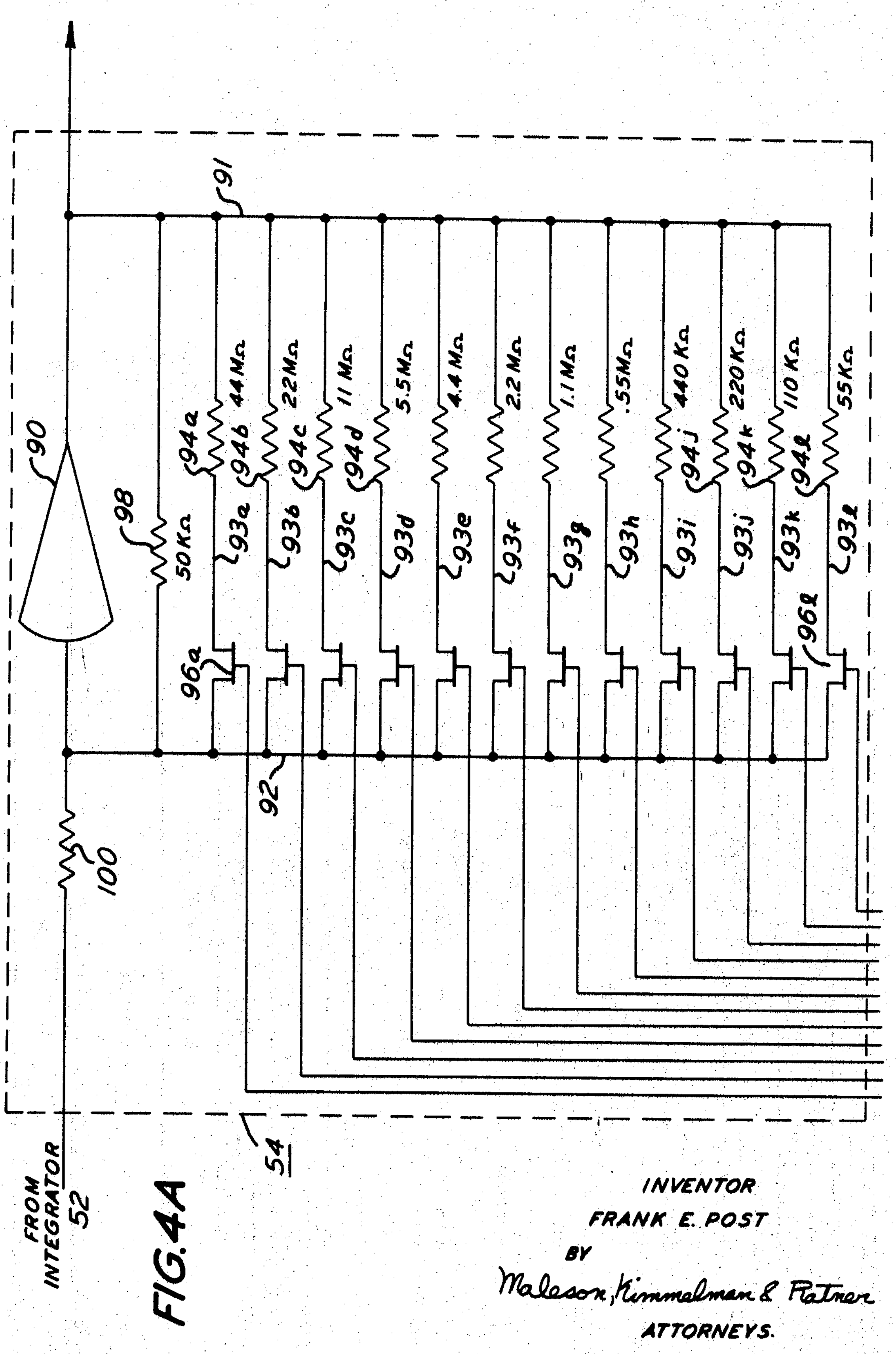
FIGS. 4A and 4B taken together illustrate in more detail portions of FIG. 2.
Figure 4B:
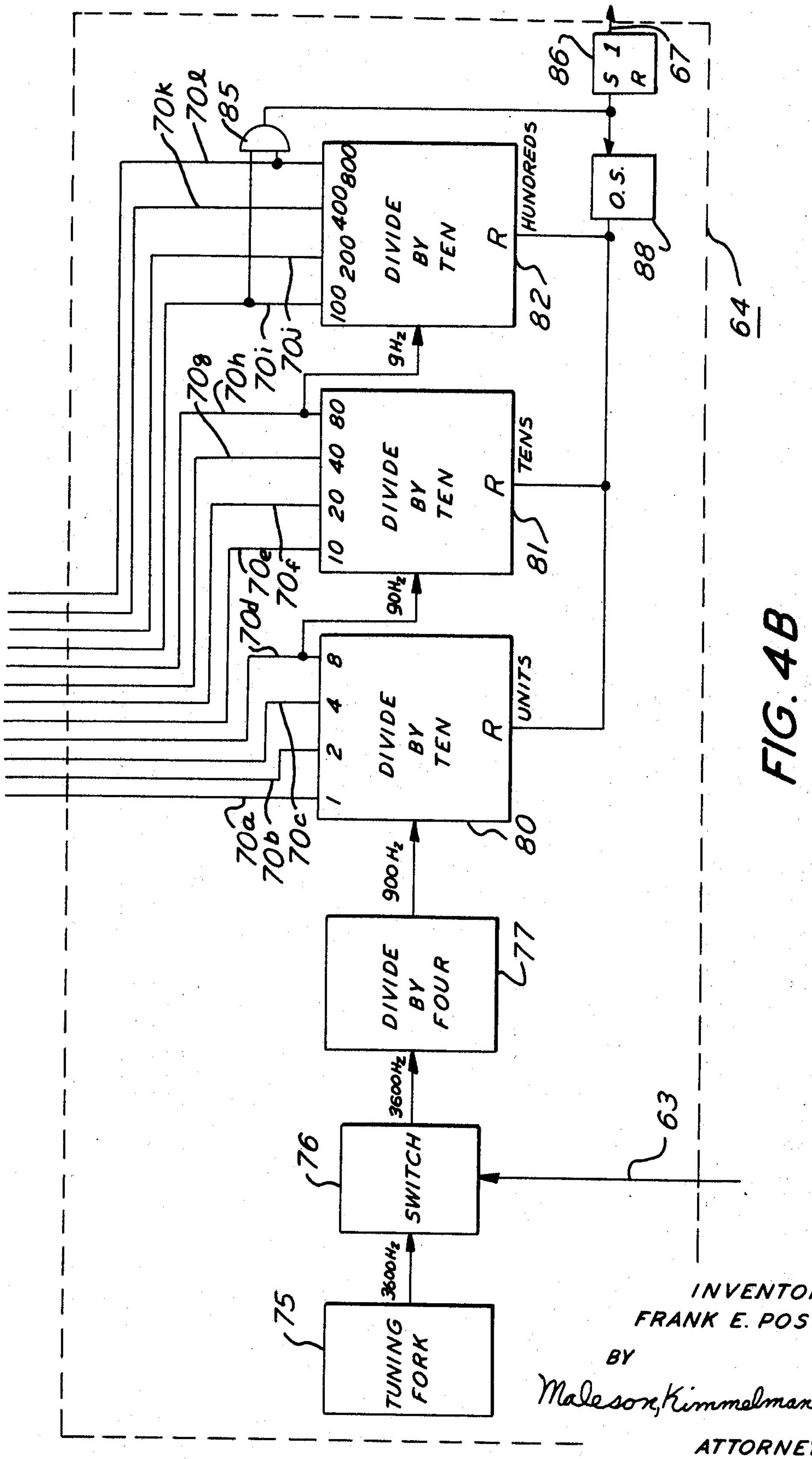

Referring now to FIGS. 4A and 4B there is shown timer 64 and amplifier 54 in more detail including the specific structure for varying the gain of the amplifier inversely proportional to the additional integration time beyond one second. More particularly, timer 64 comprises a tuning fork 75 oscillator which accurately generates a 3,600 Hz. signal which is applied by way of a switch 76 to a counter 77. Counter 77 is a conventional divide-by-four counter and provides a 900 Hz. output signal which is applied as the counting input of a first divide-by-ten decade counter 80 having BCD outputs 1, 2, 4 and 8. The 8 output of counter 80 is applied as the counting input to a second divide-by-ten decade counter 81 having BCD outputs 10, 20, 40 and 80. The trailing edge of a counting pulse produced at the 8 output of counter 80 acts as a divide-by-ten output producing a 90 Hz. signal to be counted by counter 81. Similarly, the trailing edge of a counting pulse produced at the 80 output of counter 81 acts as a divide-by-ten output which is applied as a 9 Hz. counting input to a third divide-by-ten decade counter 82. Counter 82 has BCD outputs 100, 200, 400, and 800. The least significant binary weighted outputs 1, 2, 4 and 8 apply control signals to conductors 70*a–d* respectively. Intermediate weighted outputs 10, 20, 40 and 80 are connected to conductors 70*e–h* respectively and highest significant weighted outputs 100, 200, 400 and 800 are connected to conductors 70*i–l* respectively. As well known in the arts, counter 77 may comprise a pair of flip-flops and counters 80–82 may each be a decade counter shown in Products Bulletin SC9435, type SN7490N, Texas Instruments, Inc., November 1966.

As previously described, when a 1-state signal is produced on conductor 63 indicating the actuation of the measure switch and a zero crossing, then switch 76 is turned on. Thus, the signal from tuning fork 75 is applied to counter 77 and, therefore, counters 80–82 begin a BCD count. Since a 900 Hz. signal is being counted, at one second the 100 and 800 outputs of counter 82 provide 1-state signals which are applied by way of an AND gate 85 to a set input of a flip-flop 86. Flip-flop 86 produces a 1-state time interval signal at conductor 67 indicating a one second integration period. In addition, the output of gate 85 is applied to a one shot multivibrator 88 having an output which is connected to each of the reset terminals of counters 80–82. In this manner, at one second counters 80–82 are reset and begin timing any additional time of integration beyond one second. Multivibrator 88 is used to assure the resetting of the counters in the event of possible loop delays.

To provide the variable gain for amplifier system 54, the BCD signals applied to conductors 70*a–l* are used to control individual resistance switching circuits 93*a–l* each connected in parallel feedback relation with an analog amplifier 90 and between conductors 91 and 92. In addition, a resistor 98 of fixed value is directly connected to conductors 91 and 92. For the input of amplifier, the output of integrator 52 is applied by way of input resistor 100 to the input of amplifier 90.

Each of the resistance switching circuits 93*a–l* comprises a FET switching transistor 96*a–l* respectively in series with a precision resistor 94*a–l* respectively. For example, circuit 93*a* comprises a resistor 94*a* having one end connected to conductor 91 and the other end connected to an output terminal of FET transistor 96*a*. The other output terminal of that transistor is connected to conductor 92. The remaining circuits 93*b*–93*l* are identical with circuit 93*a* except for the resistance value of the respective resistors 94*b–l*. To control circuits 93*a–l*, the bases of transistors 96*a–l* respectively are connected to conductors 70*a–l* respectively.

In order to better understand the variable gain operation and the selection of the values of resistors 94*a–l*, the following discussion may be helpful. The gain of amplifier 90 is defined as $$\text{Gain}=\frac{R_f}{R_{in}} \tag{4}$$

where:

$R_f$=total value of feedback resistance
$R_{in}$=value of resistor 100

Since the feedback resistance provided by circuits 93*a–l* and resistor 98 are in parallel, it is more convenient to consider feedback conductance rather than feedback resistance $$G_f=\frac{1}{R_f} \tag{5}$$

The conductance of fixed resistor 98 may be selected to be equal to the maximum value of the switched conductance. The maximum value is reached at one second additional time ($t_a=1$) and resistors 94*l* and 94*i* are connected in parallel with resistor 98.

$$G_f=G_1+\frac{t_a}{t_1}G_1 \tag{6}$$

where:

$G_1$=conductance of resistor 98
$t_a$=time beyond one second
$t_1$=one second Combining Equations 4 and 6 and simplifying yields $$\text{Gain}=\frac{1}{[G_1+t_aG_1]R_{in}} \tag{7}$$

$$K_1=G_1R_{in} \tag{8}$$

where $K_1$=a constant value $$\text{Gain}=\frac{1}{[1+t_a]K_1} \tag{9}$$

Solving for $t_a=0$ in Equation 9 results in a gain equal to one times the constant $1/K_1$. For the example of FIG. 3C in which $t_a=1$ the gain is calculated as one half of $1/K_1$ so that the gain is reduced by 50%. For the example of FIG. 3D in which $t_a=1/3$ the gain is reduced by 25%. For other values between $t_a=0$ and $t_a=1$ other values can be chosen as in FIGS. 3–3B and a slightly curved line may be plotted.

Thus it will now be understood that counters 80–82 and circuits 93*a–l* implement Equation 6 to provide a feedback conductance which increases linearly with time starting at $t_a=0$. Specifically resistor 94*a* provides one unit of conductance; resistor 94*b* provides two units; resistor 94*c* provides four units; resistor 94*d* provides eight units; resistor 94*e* provides ten units; etc. Typical resistance values of resistors 94*a–l* and 98 are shown in FIG. 4A. Switching circuits 93*a–l* are actuated by counters 80–82 in accordance with binary coded decimal notation to add one use of conductance for each count. Specifically as counters 80–82 count from 0 to 900 pulses the conductance is increased from 0 terminating at 900 units of conductance. Thus the maximum decrease in gain is achieved at $t_a=1$. For example for a count of 1 with a 1-state signal at the 1-output of counter 80, only resistor 94*a* is connected in parallel with resistor 98. At a count of 2, for a 1-state signal at the 2-output of counter 80, resistor 94*b* is in parallel and for a count of 3 both resistors 94*a* and 94*b* are in parallel with resistor 98 and so on. At a count of 900, with 1-state signals at both the 100 and 800-outputs of counter 82, only resistors 94*i* and 94*l* are in parallel with resistor 98 and resistors 94*i* and 94*l* provide a total of 900 units of conductance which is equal to the conductance of fixed resistor 98. A conventional truth table for the first nine counts by counter 80 is shown below. The remaining 891 counts are well understood by those skilled in the art.

COUNTER 80 OUTPUT

| Units of conductance (count) | 8 | 4 | 2 | 1 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

In summary it will now be understood that in accordance with the invention the gain of amplifier 90 at the termination of integration is inversely proportional to any additional time of integration beyond one second. At the termination of the integration period, the compensated stored DC value of the integration is read out. In order to provide for this compensation each of the integration systems 42 and 43 is controlled by a control system 45. After actuation of a measure switch and upon application of a zero crossing signal each control section is effective to simultaneously (1) begin the integration period and (2) initiate timing by timer 64. At the termination of a predetermined time interval, e.g., one second, each control section is enabled and looks for the next positive going zero crossing of the stimulating signal which represents an integer total number of cycles. At the time of that zero crossing each control section is effective to simultaneously (1) terminate integration and (2) terminate the timing by timer 64. With timer 64 at rest predetermined switches of circuits **93*a–l* have been actuated thereby to vary the gain of amplifier 90** to compensate for the integration time beyond the time interval of one second.

What is claimed is:

1. A frequency response analyzer having a function generator for providing stimulating signals in the form of uniform cyclic waveforms to a system under test and a correlator for comparing the output of the system under test with the stimulating signal comprising:
- means for producing cycle signals each indicating completion of a cycle of said waveform,
- said correlator including a sine multiplier having an output connected to first integration means and a cosine mutiplier having an output connected to second integration means, means for applying said output of said system under test to each said multiplier,
- timing means operable for producing a time interval signal after a predetermined time interval and for continuing timing until said timing means is stopped,
- means coupled to said cycle signal producing means for controlling each of said integration means upon application of a predetermined cycle signal to simultaneously (1) begin integration and (2) initiate timing by said timing means, said controlling means upon application of a first cycle signal after occurrence of said time interval signal simultaneously (1) terminating integration and (2) stopping the timing by said timing means, and
- said timing means being connected to each of said integration means for varying the amplitude of the output of each of said integration means to compensate for any additional integration time beyond said time interval.

2. The analyzer of claim 1 in which said first and second integration means each includes a plurality of switching circuits to vary the amplitude of said outputs of said integration means inversely with respect to the value of said additional integration time.

3. The analyzer of claim 1 in which there is provided first and second switching means operable for opening and closing the respective connections between (1) said sine multiplier and said first integration means and (2) said cosine multiplier and said second integration means, said controlling means including first gating means to switch to a closed position said first and second switching means upon coincidence of a cycle signal and a signal indicating measurement to be taken, said controlling means including second gating means to switch to a circuit open position said first and second switching means upon coincidence of said time interval signal and a cycle signal.

4. The analyzer of claim 1 in which said timing means includes an oscillator for generating a predetermined single frequency timing signal and in which there is further included decade counter means for counting the cycles of said timing signal and providing output signals in binary coded decimal notation in accordance with said count, a switching circuit for applying the output of said oscillator to said decade counter means when timing is initiated and for disconnecting said oscillator and said counter means when timing is stopped.

5. The analyzer of claim 4 in which there is provided first and second variable gain amplifiers respectively connected to outputs of said first and second integration means and in which there is further provided a plurality of resistor switching circuits connected in the feedback path of each of said amplifiers, and means connecting said outputs of said decade counter means to said resistor switching circuits thereby to linearly increase the conductance of said feedback paths of said amplifiers with respect to increase in said additional time.

6. A frequency response analyzer having a function generator for providing stimulating signals over a frequency range to a system under test and a correlator for comparing the output of the system under test with the stimulating signal to provide measurements comprising:
- said function generator including means for producing constant amplitude stimulating signals in the form of single frequency alternating waveforms, said generator including means for producing cycle signals indicating completion of one cycle of said waveform of predetermined frequency,
- said correlator including a sine multiplier and a cosine multiplier each controlled by said function generator, means for simultaneously applying said output of said system under test to each said multiplier,
- first and second integration means having inputs respectively connected to outputs of said sine and cosine multipliers, each of said integration means providing at a respective output DC signals proportional to the coordinates of a vector representing the fundamental frequency component of said output of said system under test,
- timing means operable for producing a time interval signal after a predetermined time interval and for continuing timing until being stopped,
- means coupled to said cycle signal producing means and said timing means for controlling said inputs of each of said integration means upon application of a predetermined cycle signal and a signal indicating a measurement is to be taken to simultaneously (1) begin integration and (2) initiate timing by said timing means, said controlling means upon application of a first cycle signal after occurrence of said time interval signal simultaneously (1) terminating integration and (2) stopping the timing by said timing means and
- switching means included within said integration means and responsive to signals from said timing means for varying the amplitude of said DC signals to compensate for any additional integration time beyond said time interval.

7. The analyzer of claim 6 in which said switching means comprises for each integration means a plurality of resistor switching circuits having differing resistance values to vary the amplitude of said DC signals inversely with respect to the value of said additional integration time.

8. The analyzer of claim 6 in which there is provided first and second variable gain amplifiers respectively connected to said outputs of said first and second integration means and in which said switching means comprises a first plurality of resistor switching circuits connected in the feedback path of said first amplifier and a second plurality of resistor switching circuits connected in the feedback path of said second amplifier and said timing means being connected to each said resistance switching circuits for varying the value of the gain of said first and second amplifiers inversely with respect to the value of said additional time.

9. The analyzer of claim 6 in which there are provided first and second analog switches respectively connected between (1) said sine multiplier and said first integration means and (2) said cosine multiplier and said second integration means, said controlling means including a first gate to switch to a circuit closed position said first and second analog switches upon coincidence of a cycle signal and a measurement signal, said controlling means including a second gate to switch to a circuit open position said first and second analog switches upon coincidence of said time interval signal and a cycle signal.

10. The analyzer of claim 6 in which said timing means includes a precision oscillator for generating a predetermined single frequency alternative timing signal, and in which there is further included decade counter means for counting the cycles of said timing signal and providing output signals in binary coded decimal notation in accordance with said count, a switching circuit connected between said precision oscillator and said decade counter means for providing a closed circuit when said controlling means initiates timing and for providing an open circuit when said controlling means stops said timing.

11. The analyzer of claim 10 in which there is provided first and second variable gain amplifiers respectively connected to outputs of said first and second integration means and in which said switching means comprises a first plurality of resistor switching circuits connected in the feedback path of said first amplifier and a second plurality of resistor switching circuits connected in the feedback path of said second amplifier and means connecting said outputs of said decade counter means to said resistor switching circuits thereby to linearly increase the conductance of said feedback paths of said first and second amplifiers with increase in said additional time whereby the gain of each of said first and second amplifier is inversely proportional to the value of said additional time of integration beyond said predetermined time interval.

12. A frequency response analyzer having a function generator and a correlator for measuring the transfer function of a system under test comprising:

said function generator including means for producing separate signals of rectangular waveform and separate signals of triangular waveform in which the slope of one of the triangular sides is reversed at each 90° of an output sinusoidal waveform formed by summing said rectangular and triangular waveforms, said generator including means for producing a zero crossing signal once every 360° of said waveform, said correlator including a sine multiplier and a cosine multiplier, means for applying the output of said system under test simultaneously to each said multiplier, $x$ and $y$ integration means having inputs respectively connected to said sine multiplier and said cosine multiplier, each of said integration means providing DC signals at the termination of each integration proportional to the cartesian coordinates of a vector representing the fundamental frequency component of said output of said system under test, timing means operable for producing a time interval signal after a predetermined time interval and for continuing timing until being turned off, means coupled to said function generator and responsive to signals therefrom for controlling the inputs of each of said integration means upon coincidence of a predetermined zero crossing signal and a signal indicating that a measurement is to be taken to simultaneously (1) begin integration and (2) initiate timing by said timing means, said controlling means upon coincidence of a first zero crossing signal and said time interval signal simultaneously (1) terminating integration and (2) stopping the timing by said timing means and switching means connected to said timing means and to each said integration means for varying the amplitude of said DC signals inversely with respect to the value of any additional integration time beyond said time interval.

13. A method of analyzing the frequency response of a system under test by applying constant amplitude stimulating signals to the system under test and then comparing the output of the test system with the stimulating signal which comprises:

producing cycle signals each indicating completion of a cycle of the stimulating signal, multiplying the output of said test system by a sine function to produce a first signal, simultaneous with said sine multiplication multiplying said output of said test system with a cosine function to produce a second signal, individually integrating said first and second signals upon occurrence of a predetermined cycle signal and simultaneously beginning timing, terminating integration after the timing of a predetermined time interal upon occurrence of a first cycle signal, and varying the amplitude of the resultant integrated signals to compensate for any additional integration time beyond said time interval.

14. The method of claim 13 in which there is provided the further step of varying the amplitude of each of the resultant integrated signals inversely with respect to the value of any additional integration time beyond said time interval.

References Cited

UNITED STATES PATENTS 3,340,469 9/1967 Catherall et al. -------- 324—57

EDWARD E. KUBASIEWICZ, Primary Examiner

U.S. Cl. X.R.

235—181; 324—77